United States Patent [19]

Tsujimura et al.

[11] Patent Number: 4,919,573
[45] Date of Patent: Apr. 24, 1990

[54] BALL END MILL

[75] Inventors: Osamu Tsujimura, Kawasaki; Tatsuo Arai, Kitamoto; Masayuki Okawa, Kawasaki, all of Japan

[73] Assignee: Mitsubishi Kinzoku Kabushiki Kaisha, Tokyo, Japan

[21] Appl. No.: 246,639

[22] Filed: Sep. 20, 1988

[30] Foreign Application Priority Data

Sep. 22, 1987 [JP] Japan .................. 62-237943
Nov. 30, 1987 [JP] Japan .................. 62-182165
Mar. 1, 1988 [JP] Japan .................. 63-27300

[51] Int. Cl.$^5$ .......................... B23C 5/10; B23C 5/14
[52] U.S. Cl. ........................... 407/40; 407/42; 407/103
[58] Field of Search .................. 407/40, 42, 103, 104, 407/113, 114

[56] References Cited

U.S. PATENT DOCUMENTS

| | | | |
|---|---|---|---|
| 2,289,344 | 7/1942 | Cedarleaf | 407/103 |
| 3,158,922 | 12/1964 | Reese | 407/40 |
| 3,597,104 | 8/1971 | Salcumbe | 407/103 |
| 3,629,919 | 12/1971 | Trevarrow | 407/103 |
| 3,829,943 | 8/1974 | Bartoszevicz et al. | 407/103 |
| 4,679,968 | 7/1987 | Tsujimura et al. | 407/42 |
| 4,693,641 | 9/1987 | Tsujimura et al. | 407/42 |

FOREIGN PATENT DOCUMENTS 3321184 12/1984 Fed. Rep. of Germany ...... 407/104
63-133923 9/1988 Japan .

Primary Examiner—William Terrell
Attorney, Agent, or Firm—Cushman, Darby & Cushman

[57] ABSTRACT

A ball end mill includes an end mill body, an indexable cutter insert, a clamp screw and shift preventing mechanism. The body has an insert receiving recess formed in a forward end portion thereof. The insert has a front face, a rear face and at least two convexly curved side faces, and has at least two convexly curved main cutting edges each defined by the intersection of a respective one of the convexly curved side faces with the front face. The insert is received in the insert receiving recess with the rear face mated with the bottom face of the recess in such a manner that one of the main cutting edges is indexed in a cutting position. The shift preventing mechanism includes an engaging recess formed in one of the bottom face of the insert receiving recess and the rear face of the insert and an engaging projection complementary to the engaging recess and provided on the other of the bottom face of the insert receiving recess and the rear face of the insert so as to be brought into engagement with the engaging recess.

7 Claims, 3 Drawing Sheets

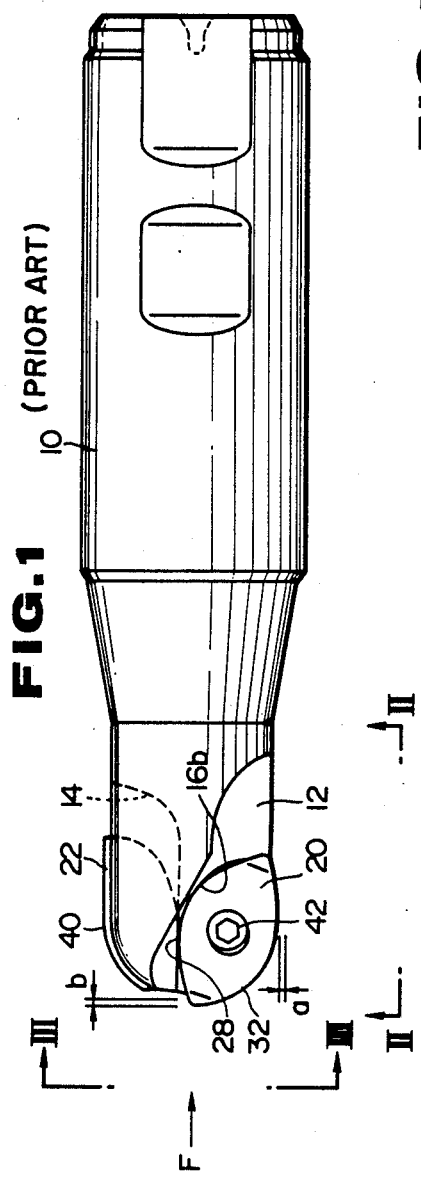
FIG.1 (PRIOR ART)
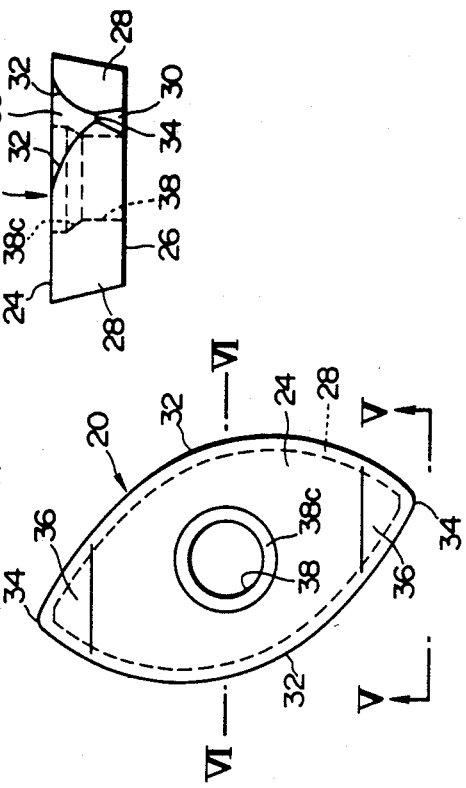
FIG.5 (PRIOR ART)
FIG.4 (PRIOR ART)
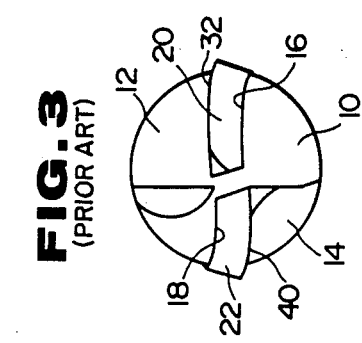
FIG.3 (PRIOR ART)
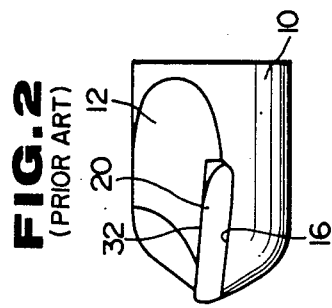
FIG.2 (PRIOR ART)

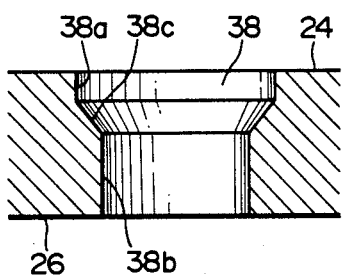
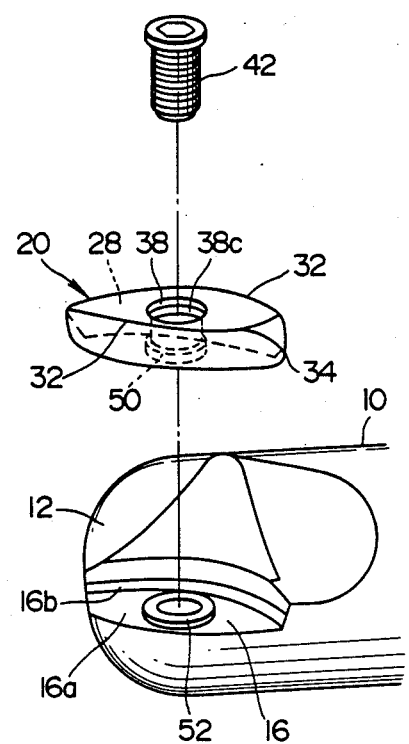
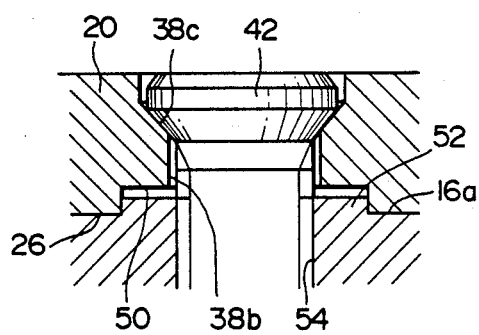
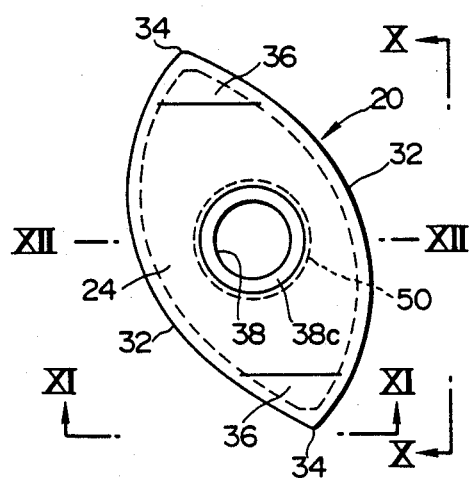
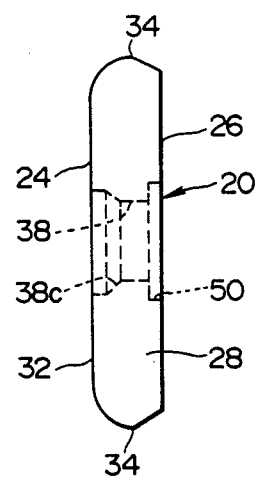

BALL END MILL

BACKGROUND OF THE INVENTION

1. Field of the Invention

The present invention relates to a ball end mill of the type having an indexable cutter insert with convexly curved cutting edges releasably attached to an outer periphery of a forward end portion of an end mill body.

2. Related Art

FIGS. 1 to 3 show one related art ball end mill of the aforedescribed type as disclosed in Japanese Utility Model Application No. 62-107230 of the same applicant.

The ball end mill includes a generally cylindrical end mill body 10 having a generally hemispherical forward end portion and a rearward end portion which is adapted to be fixedly secured to a machine spindle so that the end mill body 10 can be rotated about an axis therethrough. A pair of diametrically opposed chip pockets 12 and 14 are formed in the forward end portion of the end mill body 10, and an insert receiving recess 16, 18 is formed in that wall surface of each chip pocket 12, 14 which faces in the direction of rotation of the body 10. Indexable first and second cutter inserts 20 and 22 are releasably mounted in the recesses 16 and 18, respectively.

Out of these two inserts, the first insert 20 is so disposed as to be slightly offset forwardly of the end mill body 10 from the second insert 22. As shown in FIGS. 4 to 6, the insert 20 comprises a plate of a generally elliptical shape defined by a front face 24, a rear face 26 disposed parallel to the front face 24, and two pairs of first and second side faces 28 and 30 disposed alternately and lying between the front and rear faces 24 and 26, each side face being sloping inwardly of the plate in a direction away from the front face 24. The two first side faces 28 as well as the two second side faces 30 are opposed to each other so as to be symmetrical with respect to an axis of the plate or insert. Each first side face 28 is convexly curved so as to assume a quadrant-like shape as viewed in a direction perpendicular to the front face 24 while each second side face 30 is planar and very short as compared with the first side face 28. Each first side face and each second side face intersects each other so as to define an obtuse angle therebetween. The insert has a pair of convexly curved main cutting edges 32 each defined by the intersection of a respective one of the first side faces 28 with the front face 24, and a pair of short cutting edges 34 each defined by the intersection of a respective one of the second side faces 30 with the front face 24. Each main cutting edge 32 has a leading end where it intersects one of the short cutting edges 34 and also has a trailing end where it intersects the other short cutting edge 34, and an angle defined by the short cutting edge 28 and a line tangent to the main cutting edge 26 at its leading end is obtuse.

The front face 24 serves as a rake surface for the cutting edges, and a marginal surface portion 36 thereof disposed adjacent to each short cutting edge 34 and the adjacent leading and trailing end portions of the main cutting edges 32 intersecting the short cutting edge 34 is convexly arcuate in such a manner as to slope toward the rear face 26 toward the short cutting edge 34, whereby the leading and trailing end portions of each main cutting edge 32 are convexly curved as viewed in a side elevation. The insert plate has a central aperture 38 formed therethrough and extending from the front face 24 to the rear face 26. The aperture 38 has a greater diameter portion 38a disposed adjacent to the front face 24, a reduced diameter portion 38b disposed adjacent to the rear face 26 and a tapered portion 38c connecting the larger diameter portion 38a and the reduced diameter portion 38b together.

The second insert 22 also includes a pair of convexly curved main cutting edges 40, but its construction will not be described in detail. Each insert 20, 22 is received in a respective one of the recesses 16 and 18 and releasably secured thereto by a clamp screw 42 in such a manner that one of the main cutting edges 32, 40 is indexed in a working position so as to extend slightly beyond the forward end portion of the body 10. The clamp screw 42 is inserted through the central aperture 38 and threaded into the body 10 with its head portion held against the tapered portion 38c of the aperture 38. Further, the insert 20 is retained in position with the rear face 26 mated with a bottom face 16a of the recess 16 and with a portion of the first side face 28 defining the other main cutting edge 32 held in abutment with a portion of an arcuately shaped side wall 16b of the recess 16.

In the related art ball end mill as described above, since the leading end portion of the main cutting edge is convexly curved as viewed axially of the end mill body 10, the cutting load increases gradually as the cutting operation proceeds, and therefore a great cutting load will not be exerted on the cutting edge 32 at a time. Besides, inasmuch as the angle define by the short cutting edge 34 and the line tangent to the main cutting edge 32 has an increased strength even at its leading end. Further, the ball end mill also has advantages that it possesses a better chip-disposal ability in comparison with conventional ball end mills.

In the related art ball end mill as described above, the portion of the side wall 16b of the recess 16 undergoes a cutting load F exerted on the insert 20 in an axial direction as shown in FIG. 1. If the insert should be of a triangular or quadrilateral shape, a bearing surface on which the load F is exerted perpendicularly could be formed on the side wall of the recess. However, inasmuch as the insert 20 is of an elliptical shape, such bearing surface cannot be provided. Accordingly, when the ball end mill is fed in the axially direction at a high speed, the insert 20 is pressed axially rearwardly of the body along the side wall 16b, and that portion of the cutting edge indexed in an end cutting position is caused to shift a distance b axially rearwardly of the body while that portion of the cutting edge indexed in a peripheral cutting position is caused to shift a distance a radially outwardly of the body. As a result, the cutting accuracy is unduly lowered particularly in the peripheral cutting position.

SUMMARY OF THE INVENTION

It is therefore an object of the present invention to provide a ball end mill in which a cutter insert is firmly retained so that the cutting accuracy is highly improved.

According to the present invention, there is provided a ball end mill comprising an end mill body including an axis of rotation therethrough and an insert receiving recess formed in a forward end portion thereof and having a bottom face; an indexable cutter insert having a front face, a rear face and at least two convexly curved side faces lying between the front and rear faces, the insert having at least two convexly curved main cutting edged each defined by the intersection of a respective one of the convexly curved side faces with the front face, the insert being received in the insert receiving recess with the rear face mated with the bottom face of the recess in such a manner that one of the main cutting edges is indexed in a cutting position, the front face serving as a rake surface for the indexed main cutting edges; clamp means for releasably securing the cutter insert to the insert receiving recess; and shift preventing means for preventing the cutter insert from being shifted during a cutting operation of the ball end mill, the shift preventing means comprising a surface defining an engaging recess formed in one of the bottom face of the insert receiving recess and the rear face of the insert and an engaging projection complementary to the engaging recess and provided on the other of the bottom face of the insert receiving recess and the rear face of the insert so as to be brought into engagement with the engaging recess.

BRIEF DESCRIPTION OF THE DRAWINGS

FIG. 1 is a front elevation of a related art ball end mill;

FIG. 2 is a side elevation of a part of the end mill of FIG. 1 as seen in the direction indicated by the arrows II—II in FIG. 1;

FIG. 3 is an end view of the end mill of FIG. 1 as seen in the direction indicated by the arrows III—III in FIG. 1;

FIG. 4 is a plan view of a cutter insert employed in the end mill of FIG. 1;

FIG. 5 is a side elevation of the insert of FIG. 4 as seen in the direction indicated by the arrows V—V in FIG. 4;

FIG. 6 is a cross-sectional view of the insert of FIG. 4 taken along the line VI—VI in FIG. 4;

FIG. 7 is an exploded view of a part of a ball end mill provided in accordance with the present invention;

FIG. 8 is a cross-sectional view of a part of the end mill of FIG. 7;

FIG. 9 is a plan view of a cutter insert employed in the end mill of FIG. 7;

FIG. 10 is a side elevation of the insert of FIG. 9 as seen in the direction indicated by the arrows X—X in FIG. 9;

DESCRIPTION OF THE PREFERRED EMBODIMENTS OF THE INVENTION

Figure 11:
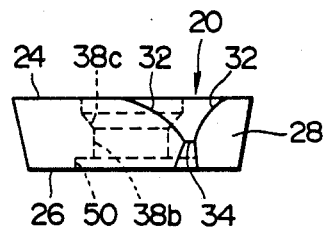
FIG. 11 is another side elevation of the insert of FIG. 9 as seen in the direction indicated by the arrows XI—XI in FIG. 9.
Figure 12:
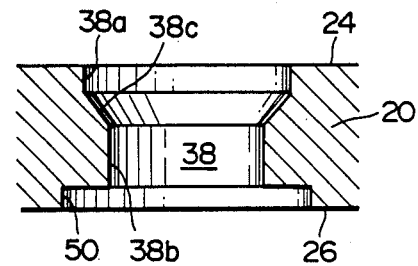
FIG. 12 is a cross-sectional view of the insert of FIG. 9 taken along the line XII—XII in FIG. 9.

Referring now to FIGS. 7 to 12, there is shown a ball end mill in accordance with the present invention. The ball end mill differs from the related art end mill shown in FIGS. 1 to 6 only in the mounting structure of the insert 20 on the end mill body 10, and hence the explanation on the structure in common with the related art end mill will be omitted by identifying the corresponding parts with the same numbers.

In this embodiment, the insert 20 includes an engaging recess 50 of a circular cross-section formed in the rear face 26 so as to be coaxial with the aperture 38. On the other hand, an engaging projection 52 complementary to the above engaging recess 50 is formed on the bottom face 16a of the insert receiving recess 16 in such a manner that its axis is slightly shifted from an axis of a threaded bore 54 into which the clamp screw 42 is threaded. Thus, as best shown in FIG. 8, the insert 20 is firmly secured to the insert receiving recess 16 with the engaging recess 50 held in firm engagement with the engaging projection 52. Therefore, even if a great axial cutting load is exerted on the insert 20 during the cutting operation, the insert 20 is positively prevented from being shifted. As a result, even if the end mill is fed at a high speed in the axial direction, the cutting accuracy in the peripheral cutting position is not lowered.

Consequently, the above ball end mill, which has superior cutting strength and chip disposal ability as is the case with the related art end mill, makes it possible to conduct the high axial feed cutting with an enhanced cutting accuracy.

In the illustrated example, the engaging recess and projection are of a circular cross-section having a diameter greater than that of the threaded bore 54 or the reduced diameter portion 38b of the aperture 38 although they may be modified to be of a polygonal or elliptical shape in cross-section. In addition, the axis of the aperture 38 of the insert 20 is shifted slightly from the axis of the threaded bore 54 so that when the insert 20 is secured to the insert receiving recess 16, it is pressed against the side wall 16b of the recess 16.

Further, although in this embodiment, the projection 52 is formed on the bottom face 16a of the insert receiving recess 16 while the engaging recess 50 complementary to the projection 52 is formed in the rear face 26 of the insert 20, the projection may be formed on the rear face of the insert while the engaging recess may be formed in the bottom face of the insert receiving recess.

The advantages of the above embodiment over the related end mill will now be verified by way of the following example.

EXAMPLE

There were prepared a ball end mill (30φ) in accordance with the invention shown in FIGS. 7 to 12 and a comparative ball end ill (30φ) shown in FIGS. 1 to 6, and static load and dynamic load (during cutting operation) were applied to each of the end mills. Then, the radial shifting a (mm) and axial shifting b (mm) as defined in FIG. 1 were measured. The results are shown in the following table.

TABLE

|  | End mill of the invention | | Related art end mill | |
| --- | --- | --- | --- | --- |
|  | a | b | a | b |
| Static load | | | | |
| Max 500 Kg | 0.02 | 0.04 | 0.10 | 0.20 |
| Dynamic load | | | | |
| 300 mm/min* | 0.01 | 0.02 | 0.03 | 0.06 |
| 500 mm/min* | 0.02 | 0.04 | 0.07 | 0.15 |

*denotes the cutting speed in the axial direction

As will be seen from Table, the shifting of the insert is positively prevented in the end mill of the invention.

Figure 13:
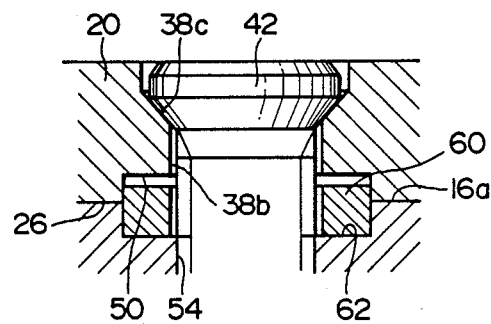
FIG. 13 is a view similar to FIG. 8, but showing a modified ball end mill in accordance with the present invention.

FIG. 13 depicts a ball end mill in accordance with a second embodiment of the invention which differs from the first embodiment in that an engaging annular member or ring 60 is mounted in a ring receiving recess 62 formed in the bottom face 16a of the insert receiving recess 16 to provide an engaging projection to be engagingly fitted into the engaging recess 50 of the insert 20. The ring receiving recess 62 is formed so as to have an inner diameter sufficiently greater than that of the reduced diameter portion 38b of the aperture 38. On the other hand, the ring 60 is formed such that its outer diameter is slightly larger than the inner diameter of the ring receiving recess 62, and that its height or axial length is greater than the depth of the recess 62. The ring 60 is hence press-fitted into the recess 62 by means of a wooden hammer or the like with its upper portion protruded upwardly from the bottom face 16a of the recess 16, and the insert 20 is secured to the insert receiving recess 16 with its engaging recess 50 held in firm engagement with the protruding upper portion of the ring 60. The ring 60 may be formed of steel of which the end mill body 10 is also made, but could as well be made of other material such as hardened steel. When the ring 60 is made of hardened steel, the ring is harder than the end mill body 10, and therefore it can be easily fitted into the recess 50 even though the end mill is of a small size.

Thus, in this embodiment, the insert 20 is fixedly secured to the insert receiving recess 16 with its engaging recess 50 held in firm engagement with the ring 60. Therefore, even if a great axial cutting load is exerted on the insert 20 during the cutting operation, the insert 20 is positively prevented from being shifted.

In addition, as compared with the end mill of the first embodiment, the above end mill can be more easily manufactured since the ring receiving recess 62 can be more easily formed than the projection 52. This is particularly true with the end mill of a small size. Besides, even if the ring 60 is damaged during the exchange of the insert 20, the end mill can be utilized again by replacing the ring 60 by a new one, thereby prolonging the service life of the end mill.

Figure 14:
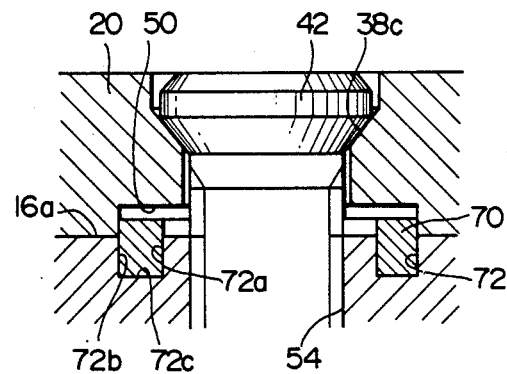
FIG. 14 is a view similar to FIG. 8, but showing a further modified ball end mill.
Figure 15:
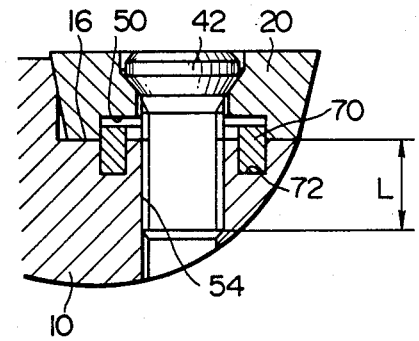
FIG. 15 is also a cross-sectional view of the end mill of FIG. 14.

FIGS. 14 and 15 depict a ball end mill in accordance with a third embodiment of the invention which differs from the second embodiment in that the ring 60 is replaced by an annular member or ring 70 with a larger inner diameter. Namely, an annular groove 72, which has an inner diameter sufficiently greater than that of the threaded bore 54 and is defined by inner and outer peripheral walls 72a and 72b and a bottom 72c joining the inner and outer walls at their lower ends, is formed in the bottom face 16a of the insert receiving recess 16 so as to be generally coaxial with the threaded bore 54 to define an annular portion therebetween. The ring 70 has a radial thickness identical to the width of the groove 72 and is press-fitted into the groove 72 with its inner and outer peripheral surfaces and a lower end face mated with the inner and outer peripheral walls and the bottom of the groove 72, respectively. As is the case with the previous embodiment, the ring 70 has an axial length greater than the depth of the groove 72 so that its upper portion protrudes from the groove. As is the case with the ring 60, the ring 70 may be preferably made of hardened steel. Thus, the insert 20 is fixedly secured to the insert receiving recess 16 with the engaging recess 50 held in firm engagement with the upper portion of the ring 70.

In this embodiment, the ring 70 itself can be secured to the end mill body 10 more firmly than in the second embodiment since the three surfaces of the ring 70 are engaged with the body 10. Further, since the annular groove 72 is formed so as to be spaced from the threaded bore 54, the effective length of the threaded bore 54, as designated at L in FIG. 15, can be made sufficiently long. Therefore, the clamping force caused by the clamp screw 42 can also be maintained great.

Obviously many modifications and variations of the present invention are possible in the light of the above teachings. It is therefore to be understood that within the scope of the appended claims, the invention may be practiced otherwise than as specifically described.

What is claimed is:

1. A ball end mill comprising:
an end mill body including an axis of rotation therethrough and an insert receiving recess formed in a forward end portion thereof and having a bottom face;
an indexable cutter insert having a front face, a rear face and at least two convexly curved side faces lying between said front and rear faces, said insert having at least two convexly curved main cutting edges each defined by the intersection of a respective one of said convexly curved side faces with said front face, said insert being received in said insert receiving recess with said rear face mated with said bottom face of said recess in such a manner that one of said main cutting edges is indexed in a cutting position, said front face serving as a rake surface for said indexed main cutting edges;
clamp means for releasably securing said cutter insert to said insert receiving recess; and
shift preventing means for preventing said cutter insert from being shifted during a cutting operation of the ball end mill, said shift preventing means comprising a surface defining a shouldered engaging recess formed in one of the bottom face of said insert receiving recess and the rear face of said insert and an engaging projection complementary to said engaging recess and provided on the other of the bottom face of said insert receiving recess and the rear face of said insert so as to be brought into engagement with said shouldered engaging recess with said surface of said shouldered engaging recess being in circumferential surrounding relationship with said engaging projection said bottom face of said insert receiving recess facing generally in the direction of rotation of said body, said insert receiving recess having a generally arcuate side wall facing axially forwardly and radially outwardly of said end mill body, said insert being of a generally ellipsoidal shape having a pair of said convexly curved side faces, one of said side faces cooperating with said front face to define the other main cutting edge, said other main cutting edge being held in abutment with said side wall, said cutter insert having a centrally located aperture therethrough with said shouldered engaging recess surrounding said aperture in said cutter insert so as to be coaxial therewith, said clamp means comprising a screw and said insert receiving recess having a threaded bore receiving said screw when said screw is passed through said aperture in said cutter insert.

2. A ball end mill according to claim 1, in which said engaging projection is integrally formed on the bottom face of said insert receiving recess while said shouldered engaging recess is formed in the rear face of said insert.

3. A ball end mill according to claim 1, in which said end mill body includes a projection receiving recess formed in the bottom face of said insert receiving recess, said projection of said shift preventing means being comprised of an engaging member press-fitted in said projection receiving recess so as to protrude from the bottom face of said insert receiving recess, said shouldered engaging recess being formed in said rear face of said insert.

4. A ball end mill according to claim 3, in which said engaging member is of an annular shape.

5. A ball end mill according to claim 3, in which said engaging member is made of a material harder than said end mill body.

6. The ball end mill as claimed in claim 1, wherein said bottom face of said insert receiving recess has a projection receiving recess formed therein, said shift preventing means including a ring press-fitted in said projection receiving recess so as to protrude from said bottom face of said insert receiving recess so that said ring engages with said shouldered engaging recess of said cutter insert, said projection receiving recess surrounding said threaded bore.

7. The ball end mill as claimed in claim 1, wherein said bottom face of said insert receiving recess has a tubular groove formed in said bottom face, a ring being press-fitted in said tubular groove so as to protrude from said bottom face of said insert receiving recess so that said ring engages said shouldered engaging recess of said cutter insert.

* * * * *